A. B. AND L. L. STEVENSON.
INCUBATOR TRAY.
APPLICATION FILED MAR. 7, 1921.
1,391,865.
Patented Sept. 27, 1921.
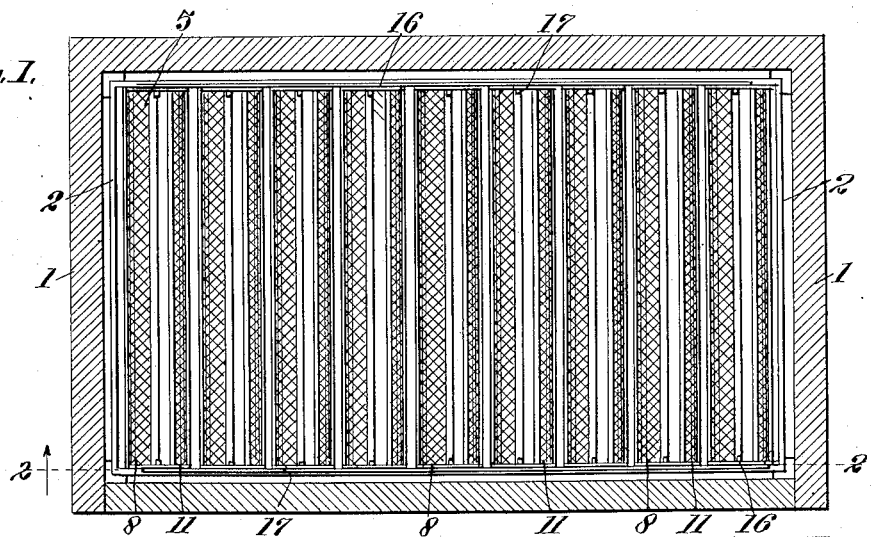
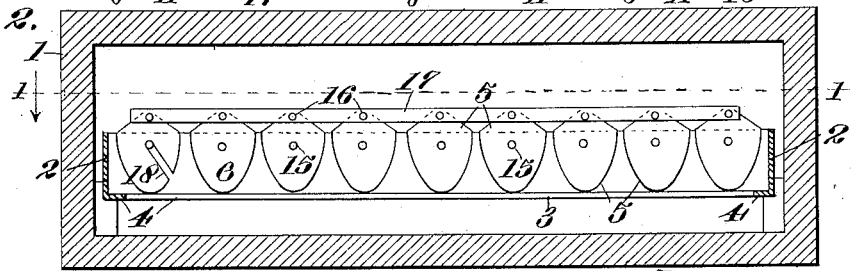
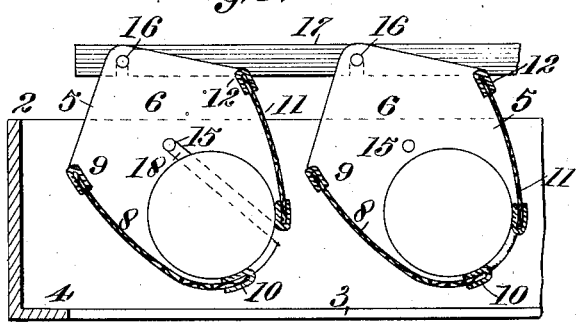
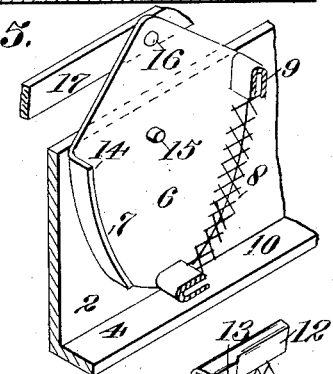
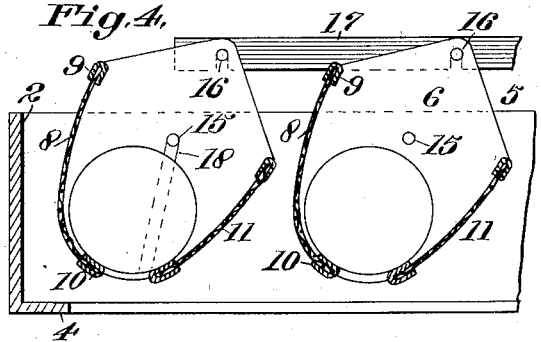
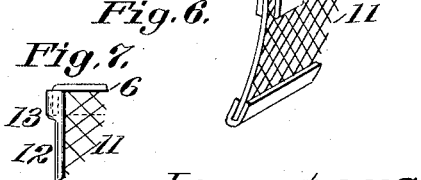
Inventors
Archie B. Stevenson
Lewis L. Stevenson.
By Ackert Totten
Attorneys,

UNITED STATES PATENT OFFICE.

ARCHIE B. STEVENSON AND LEWIS L. STEVENSON, OF SONOMA, CALIFORNIA.

INCUBATOR-TRAY.

1,391,865.  Specification of Letters Patent.  Patented Sept. 27, 1921.

Application filed March 7, 1921. Serial No. 450,117.

*To all whom it may concern:*

Be it known that we, ARCHIE B. STEVENSON and LEWIS L. STEVENSON, citizens of the United States, residing at Sonoma, in the county of Sonoma and State of California, have invented certain new and useful Improvements in Incubator-Trays, of which the following is a specification.

The present invention relates to trays for incubators used in the hatching of poultry.

The essential objects of the invention are to provide a series of egg holding cradles capable of movement whereby the eggs held therein are turned at the required time, and without the necessity of turning each egg separately and removing the tray from the incubator.

A further object is to provide a construction wherein one side wall of each tray is removable, and the trays are mounted in such manner as to enable the permanent walls to be so positioned as to form a substantially continuous floor or supporting surface for the poultry as hatched, thereby eliminating the necessity of immediately removing the hatched poultry from the tray into a brooder.

A further object is to removably mount the endmost cradle of the series within the frame whereby the same at any desired time, preferably immediately after the testing, may be removed from the frame to provide a space at one end of the frame for the passage of the newly hatched poultry from the supporting floor to a space in the incubator below the frame.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1 is a view in plan of the preferred embodiment of our invention taken on line 1—1 of Fig. 2.

Fig. 2 is a vertical sectional view taken on line 2—2 of Fig. 1 and illustrating the frame, the cradles pivotally mounted therein, and the cradle operating rod.

Fig. 3 is a view in detail of a pair of cradles showing the same pivoted in one direction.

Fig. 4 is a view similar to Fig. 3 with the cradles pivoted in the opposite direction, illustrating the manner of turning the eggs.

Fig. 5 is a perspective view of a cradle end plate disclosing the permanent side wall and the opposing flange for receiving the removable side wall.

Fig. 6 is a view in perspective of one end portion of a removable side wall of a cradle, and Fig. 7 is a fragmentary view of the manner of attaching the removable side wall end to the end plate flange.

Referring more particularly to the several views of the drawings wherein like characters of reference designate corresponding parts, 1 illustrates any conventional form of incubator within which is removably positioned an incubator tray frame 2 substantially rectangular in form and provided with an open bottom 3, the lower edge of the side wall forming said frame being inwardly flanged as at 4 to insure strength and rigidity to the frame.

Extending transversely of the frame in parallel spaced relation are suitable egg receiving cradles 5, said cradles each consisting of spaced end plates 6, the said edges of which are curved downwardly and inwardly and meet at the vertical center of said plate, the upper portion of said edges abruptly converging to form a peak at the upper end of the plate. The corresponding edges of opposing plates are formed with the inwardly projecting flange 7 extending approximately the full length of one half of the side wall, and the opposite edges of the plates of any given set are united by the open mesh material 8 bound on its upper and lower edges, as at 9 and 10, with the protecting members preferably U-shaped in cross section, as in Fig. 6. The lower edge of the material forming the permanent wall of each cradle terminates at the vertical center of the end plate, as in Figs. 3 to 5. To complete the formation of each cradle, we employ a removable side wall 11, of the same material as the wall 8, and constructed in substantially the same manner, with the exception that the upper binder 12, at its ends, is provided with the offset 13 for receiving the upper end 14 of the respective flanges. When the removable walls 11 are in position to complete the conformation of the cradles, their end portions overlie the inner faces of the flanges 7 with the upper end of the flanges received beneath the raised portion 13; thus said removable walls are firmly held in position with their lower edges terminating in slight spaced relation with the lower edge of the permanent wall 8. The end plates 6 are fulcrumed to the frame 2, as at 15, which point is slightly above the center of said plates, which mounting permits of the swinging of the cradles and at the same time enables the weight of the eggs to tend to hold said trays in a vertical position. The end plates at corresponding ends of the cradles are provided with outwardly projecting pins 16 fulcrumed within an operating rod 17 common to all of the cradles; thus the movement of the rod will cause a simultaneous pivotal movement of the cradles enabling the eggs therein to rest on opposite sides when desired, and the movement of the rod 17 enables the pivoting of the cradles to position the permanent walls 8 of adjacent trays in substantially horizontal position to provide a substantially continuous bottom wall for the tray when said removable side walls 11 are removed from their respective end members.

Suitable means may be provided in any well known form for retaining the cradles in their pivoted position.

The endmost tray of the series is provided in each end wall with a radial inwardly cut slot 18 for receiving the fulcrum pin 15, which construction enables the end cradle of the series to be removed from the frame and to provide a space for the hatched poultry to pass beneath the frame 4 into the lower part of the incubator.

Having thus described our invention what we claim as new and desire to secure by Letters Patent of the United States is:—

1. An incubator tray consisting of an open tray frame, a plurality of parallel spaced cradles pivotally mounted at their ends in said frame, said cradles each provided with a removable side wall and an operating member pivotally connected to all of said cradles whereby the same may be pivoted in unison within said frame and to position the side edges of one wall of adjacent cradles in substantially meeting relation in a horizontal plane to provide a substantially continuous floor for the frame when desired.

2. An incubator tray consisting of an open tray frame, a plurality of parallel spaced cradles pivotally mounted at their ends in said frame, the said cradles formed of open mesh material of substantially U-shape in cross section, said cradles each formed with a removable side wall, and an operating member pivotally connected to all of said cradles whereby the same may be pivoted in unison within said frame to position the side edges of one wall of adjacent cradles in substantially meeting relation in a horizontal plane to provide a substantially continuous floor for the frame when desired.

3. An incubator tray consisting of a tray frame, a plurality of open topped elongated cradles pivotally mounted therein in parallel relation, said cradles each formed with a removable side wall, means for simultaneously pivoting said cradles, to position the side walls of said cradles to provide a substantially continuous floor for the frame when desired, and a detachable connection between the endmost cradle of the series and said frame, and between said cradle and said pivoting means whereby said end cradle may be removed from the frame.

In testimony whereof we have signed our names to this specification.

ARCHIE B. STEVENSON.
LEWIS L. STEVENSON.